UNITED STATES PATENT OFFICE.

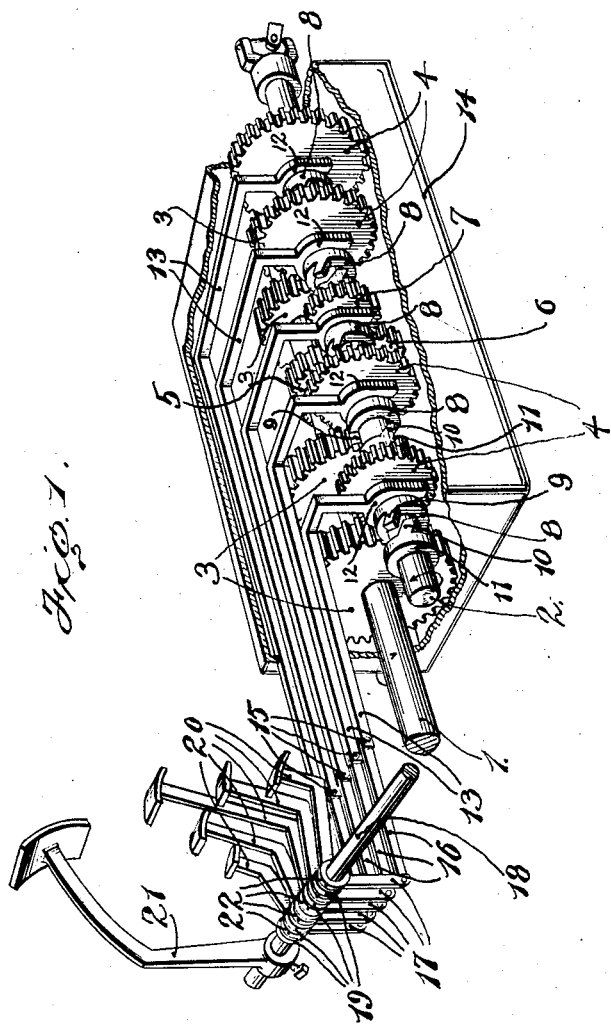

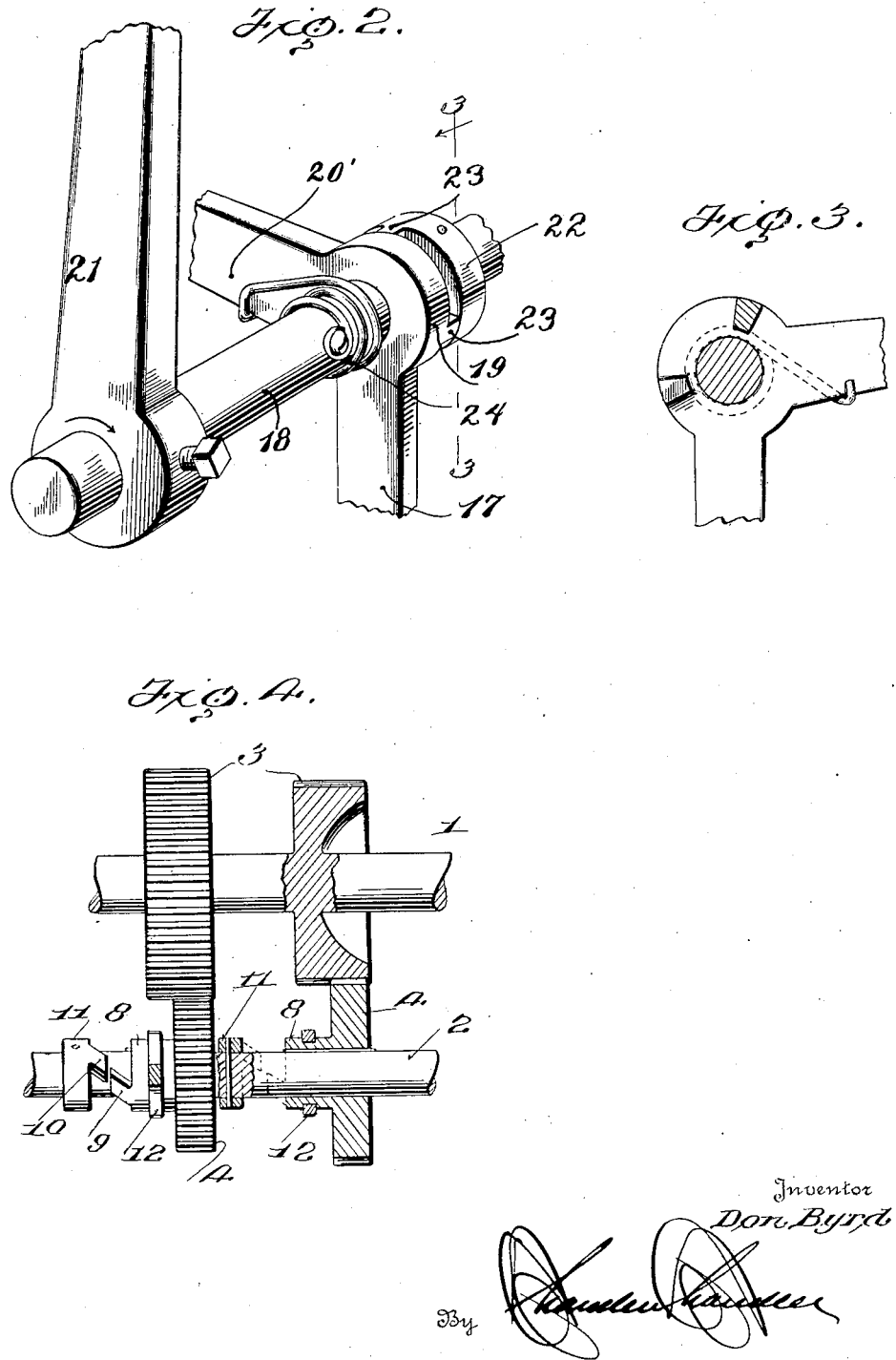

DON BYRD, OF FRANKLIN, WEST VIRGINIA.

TRANSMISSION-GEAR.

1,347,804.　　　　Specification of Letters Patent.　　Patented July 27, 1920.

Application filed April 10, 1919.　Serial No. 289,098.

*To all whom it may concern:*

Be it known that I, DON BYRD, a citizen of the United States, residing at Franklin, in the county of Pendleton, State of West Virginia, have invented certain new and useful Improvements in Transmission-Gears; and I do hereby declare the following to be a full, clear, and exact description of the invention, such as will enable others skilled in the art to which it appertains to make and use the same.

This invention relates to transmission gearings, and has particular reference to transmission gearings such as are employed in automobiles and motor cars.

The object of the invention is to provide transmission gearing wherein two parallel shafts carry pairs of constantly meshed gears, one gear of each pair being slidable upon its respective shaft and capable of being clutched thereto in selective manner, the distinctive feature of the arrangement residing in the fact that when one gear is clutched to drive the second shaft, the previously clutched gear is automatically disengaged. This operation is effective in changing the gear from lower to higher speeds or from higher to lower speeds.

A further object of the invention is to provide a peculiar form of pedal mechanism to control the transmission gearing, whereby the operator's feet are given entire control of the car. This combination of sliding gear transmission and entire foot control is a desirable one, and is capable of being installed upon the high power cars in an effective manner.

With the above and other objects in view, and such others relating to the details of construction as may hereinafter appear, my invention will now be fully set forth and described reference being had to the accompanying drawings, in which like reference characters indicate like parts throughout and:—

Figure 1 is a perspective view of the transmission gearing and pedal mechanism.

Fig. 2 is an enlarged detail perspective view of a portion of the pedal mechanism.

Fig. 3 is a section on the line 3—3 of Fig. 2, and

Fig. 4 is an enlarged detail view, partly in plan, and partly in section, of a portion of the transmission gearing.

Referring more particularly to the drawings, 1 represents the driving shaft and 2 the driven shaft, which may be connected to the engine and the differential, respectively, in any accepted or usual manner. Mounted upon the shaft 1 is a series of gears 3 which mesh constantly with a series of gears 4, on the driven shaft, the ratios of the gears being such as to provide the desired number of speeds in addition to the reversing gear 5, which through a pinion 6 meshes with a gear 7 upon the shaft 2. The gears 3 are of a greater width than the gears 4, so that the latter, which are slidable upon the shaft 2 may be actuated longitudinally of said shaft and still maintain a constant engagement with the gears 3.

Furthermore, each of the gears 4, as well as the gear 7 is provided with a hub extension 8 to one side, upon which is formed angularly directed clutch elements 9, each of which is adapted to be engaged, at one limit of the sliding movement of the gears 4 with a respective clutch element 10 which is extended to one side of hub 11 fixed to the shaft 2 opposite each of the hub extensions 8. Each of the clutch elements 10 extends in opposition to the corresponding clutch element 9, but has the same angular direction, so that when a clutch element 9 engages the acute angled face of an element 10, the corresponding gear 4 is clutched to the shaft 2, but when the clutch element 9 engages the opposite or obtuse-angled face of an element 10, the opposing or contacting faces have a cam action upon one another, so that the corresponding gear 4 is thrown away from the clutch element 10 and the gear is allowed to run idly.

Each of the hub extensions 8 is also constructed to receive a shipper yoke 12 each of which is suspended from the end of an L-shaped shipper rod 13. The shipper rods 13 slide longitudinally through the upper part of a casing 14 within which the transmission elements are mounted, and extend through the forward wall of the same, so that, by means of swinging couplings 15, and the links 16, they may be coupled to the arms 17 which are suspended from the clutch pedal shaft 18. The arms 17 swing loosely on the shaft 18 by means of the collars 19 which surround the shaft 18 and carry the respective pedals 20. In the present arrangement, I have found it convenient to arrange four forward speed pedals 20 in pairs upon the opposite sides of the reverse gear pedal, and also to elevate certain pedals above others for convenience in the manipulation of the transmission gearing. The clutch pedal shaft 18 carries the clutch pedal 21 to operate a clutch of any approved type, the clutch not being shown in this case.

It will be noted from Fig. 2 that each of the collars 19 is the hub of a bell crank lever which includes its respective arms 17 and the pedal lever 20', and is also the complement of a fixed collar 22 upon the shaft 18 to which it may be clutched at certain times by means of the clutch elements 23 upon the collars 19 and 22. This clutch mechanism constitutes an association between the clutch mechanism and the transmission mechanism, as follows:—

Following or surrounding the shaft 18 adjacent each of the collars 19 is a spring 24, one end of which is connected to the shaft and the other end of which is tensioned in a manner to normally throw the pedal levers 20 upward and the arms 17 rearward. The springs 24 normally function, then to keep the transmission or gear pedals in normal inactive position, and in changing gears from a lower to a higher speed the springs automatically raise their respective pedals to inactive position as the corresponding lower gears are released by the shifting in of the next gear and the consequent overrunning of the driven shaft so as to cause the clutch members 8 and 9 to disengage. However, the operation differs slightly in going from a higher to a lower speed. Thus, the foot is pressed upon the clutch pedal 21 so as to carry it to a point where the elements 23 are about to engage, at which time the clutch is disengaged. Continued movement of the clutch pedal causes the interlocking of the elements 23 so that the collar 19 effected is carried around in the direction to draw the corresponding transmission gear out of its driving position, it being evident that the disengagement of the clutch frees the shaft 1 so that the next lower gear can be engaged and the engaged pinion drawn out. Obviously, when the clutch is disengaged, the momentum of the car slackens, so that while the one gear is backed off, the speed approaches that at which the next lower gear can take up the drive without being thrown out by the drifting of the car ahead of the engine.

In stopping the car, the disengagement of the clutch throws out the engaged gear and the application of the brakes is all that is required to bring the car to a standstill. When the car is drifting, as down a mountain side, the pressure of the foot on the required pedal to give the necessary speed to cross a hollow or depression is all that is needed to keep up the motion of the car.

It will be apparent from the foregoing that I have devised a transmission gear for automobiles which is exceedingly simple in its arrangement of parts and in its operation, and that it eliminates the possibility of "gear-stripping." Also, by reason of the improved form of gear clutching members, the car's motion is increased in a smooth and gradual manner as the speeds are successively introduced, since the driving gear is not released except as the result of the shifting in the next driver, and the momentum of the vehicle cannot drop and then be picked up with a jerk.

What I claim as my invention is:—

In a transmission mechanism, and engine clutch control mechanism including a rotatable shaft and means for imparting rotary movement to the shaft, a change speed gear mechanism for a speed control including a series of gears and clutches, levers controlling the clutches, each lever having a hub by which it is loosely mounted upon said shaft, clutch elements carried by the hubs of said levers, and clutch elements carried by the shaft for engaging the clutch elements of the levers to impart movement to the levers when the shaft is rotated.

In testimony whereof I affix my signature, in the presence of two witnesses.

DON BYRD.

Witnesses:
H. ELLIS CHANDLEE,
S. K. W. EINSTEIN.